United States Patent
Smith, III et al.

(10) Patent No.: US 6,606,369 B1
(45) Date of Patent: Aug. 12, 2003

(54) NUCLEAR REACTOR WITH IMPROVED GRID

(75) Inventors: Levie David Smith, III, Columbia, SC (US); Yonghwan Kim, Tae-on (KR); Yu Chung Lee, Columbia, SC (US); David Lee Stucker, Irmo, SC (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 10/092,946

(22) Filed: Mar. 6, 2002

(51) Int. Cl.⁷ .............................................. G21C 3/352
(52) U.S. Cl. ...................................... 376/438; 376/442
(58) Field of Search .................................. 376/438, 442

(56) References Cited

U.S. PATENT DOCUMENTS

| | | |
|---|---|---|
| 3,862,000 A | 1/1975 | Pugh et al. |
| 4,268,356 A | 5/1981 | Kmonk et al. |
| 4,474,730 A | 10/1984 | Hellman et al. |
| 4,521,374 A | 6/1985 | Duncan |
| 4,576,786 A | 3/1986 | DeMario |
| 4,578,240 A | 3/1986 | Cadwell |
| 4,585,615 A | 4/1986 | DeMario |
| 4,585,616 A | 4/1986 | DeMario et al. |
| 4,659,541 A | 4/1987 | Rylatt |
| 4,659,542 A | 4/1987 | Kerrey |
| 4,678,632 A | 7/1987 | Ferrari |
| 4,702,881 A | 10/1987 | Weiland et al. |
| 4,758,403 A | 7/1988 | Noailly |
| 4,803,043 A * | 2/1989 | DeMario et al. ............. 376/442 |
| 4,873,051 A | 10/1989 | Duncan et al. |
| 4,879,090 A * | 11/1989 | Perrotti et al. .............. 376/462 |
| 4,885,127 A | 12/1989 | Yokoyama |
| 4,895,698 A | 1/1990 | DeMario |
| 4,923,669 A | 5/1990 | DeMario |
| 4,957,697 A | 9/1990 | Wada |
| 5,110,539 A * | 5/1992 | Perrotti et al. .............. 376/439 |
| 5,299,245 A * | 3/1994 | Aldrich et al. .............. 376/439 |
| 5,440,599 A | 8/1995 | Rodack et al. |
| 5,444,748 A * | 8/1995 | Beuchel et al. ............. 376/438 |
| 5,515,408 A * | 5/1996 | Oyama et al. .............. 376/434 |
| 6,167,105 A * | 12/2000 | Yoon et al. .................. 376/441 |
| 6,236,702 B1 * | 5/2001 | Chun et al. ................. 376/462 |
| 6,310,932 B1 * | 10/2001 | Evans et al. ................ 376/442 |
| 6,421,407 B1 * | 7/2002 | Kang et al. ................. 376/439 |

FOREIGN PATENT DOCUMENTS

WO WO-9903108 * 1/1999 .................. 376/439

* cited by examiner

*Primary Examiner*—Peter M. Poon
*Assistant Examiner*—David Matz

(57) ABSTRACT

An improved grid for use in a fuel assembly of a nuclear reactor includes a plurality of straps connected in a lattice, with a plurality of mixing vanes being disposed on the straps and being arranged such that the hydraulic forces on the mixing vanes generally cancel one another out. The mixing vanes of diagonal quadrants of the grid are generally aligned with diagonally disposed imaginary alignment planes. Each strap includes a plurality of strap members, with each strap member including a spring and a pair of dimples. The spring includes a contoured spring embossment having a greater radius of curvature in a relaxed condition than the radius of a fuel rod. Each dimple includes a similarly configured contoured dimple embossment. The spring embossment is mounted on a pair of legs that extend nonlinearly between a first plate and a second plate of each strap member to increase compliance thereof.

16 Claims, 10 Drawing Sheets

NUCLEAR REACTOR WITH IMPROVED GRID

BACKGROUND OF THE INVENTION

1. Field of the Invention

The present invention relates generally to nuclear reactors and, more particularly, to a pressurized water nuclear reactor having an improved grid.

2. Description of the Related Art

In most pressurized water nuclear reactors, the reactor core is comprised of a large number of elongated fuel assemblies. These fuel assemblies typically include a plurality of fuel rods held in an organized array by a plurality of grids that are spaced axially along the fuel assembly length and are attached to a plurality of elongated thimble tubes of the fuel assembly. The thimble tubes typically receive control rods, plugging devices, or instrumentation therein. Top and bottom nozzles on opposite ends of the fuel assembly are secured to the ends of the thimble tubes that extend slightly above and below the ends of the fuel rods.

The grids, as is known in the relevant art, are used to precisely maintain the spacing between the fuel rods in the reactor core, resist rod vibration, provide lateral support for the fuel rods and, to some extent, vertically restrain the rods against longitudinal movement. One type of conventional grid design includes a plurality of interleaved straps that together form an egg-crate configuration having a plurality of roughly square cells which individually accept the fuel rods therein. Depending upon the configuration of the thimble tubes, the thimble tubes can either be received in cells that are sized the same as those that receive fuel rods therein, or can be received in relatively larger thimble cells defined in the interleaved straps.

The straps are configured such that the cells each include a pair of relatively compliant springs and plurality of relatively rigid dimples, with the springs and dimples being formed into the metal of the interleaved straps and protruding outwardly therefrom. The springs and dimples of each cell engage the respective fuel rod extending through the cell. Outer straps of the grid are attached together and peripherally enclose the inner straps of the grid to impart strength and rigidity to the grid.

Depending upon the specific configuration of the grid and the straps, the straps may each include one or more mixing vanes formed thereon that facilitate mixing of the water within the reactor and thus promote convective heat exchange between the fuel rods and the water. Since the reactor is designed such that the water moves generally vertically upward through each fuel assembly, the mixing vanes, while promoting mixing of the water, nevertheless impart forces and torques to the grid as a result of the water impinging on the vanes. Such forces and torques on the grid can result in an overall or resultant force, bending moment, or torque applied by the grid to the fuel rods and thimble tubes with resultant stresses and vibrations therebetween. It is thus desired to provide an improved grid design having mixing vanes that are advantageously arranged in such a fashion to result in at most only negligible unbalanced forces, moments, or torques being applied from the grid to the fuel rods and thimble tubes other than forces applied longitudinally to the thimble tubes and compressive and frictional forces applied to retain the fuel rods within the cells.

It is also known in the relevant art that during operation of the reactor the elevated temperatures, pressures, and fluid velocities within the reactor tend to cause vibrations between the grids and the fuel rods. Since the grids support the fuel rods within the fuel cell, such vibrations therebetween can result in fretting of the fuel rods. Such fretting, if sufficiently severe, can result in breach of the fuel rod cladding with resultant nuclear contamination of the water within the reactor. It is thus desired to provide an improved grid having springs and dimples that are designed to minimize fretting wear between the grids and the fuel rods.

SUMMARY OF THE INVENTION

In accordance with the foregoing, an improved grid for use in a fuel assembly of a nuclear reactor having a plurality of thimble tubes includes a plurality of first and second straps that are connected with one another in a lattice to define a plurality of cells, with a plurality of mixing vanes being disposed on the first and second straps, and with the mixing vanes being arranged such that the hydraulic forces on the mixing vanes of the grid generally cancel out one another to result in at most only nominal unbalanced forces, moments, and torques being applied to the thimble tubes. The mixing vanes of diagonal quadrants of the grid are generally aligned with imaginary alignment planes that are diagonally disposed on the grid. The grid also includes a plurality of strap members, with each strap member including a spring and a pair of dimples. The spring includes a contoured surface shape having a greater radius of curvature in a relaxed condition than the radius of a fuel rod, and may additionally include a spring embossment. Each dimple includes a contoured surface shape that is similarly configured and that may similarly include a dimple embossment. The spring embossment is mounted on a pair of legs that extend nonlinearly between a first plate and a second plate of each strap member to increase the compliance of the legs.

An aspect of the present invention is to provide a grid for a fuel assembly of a nuclear reactor in which the mixing vanes of the grid are advantageously configured to minimize unbalanced forces, moments, and torques applied between the grids and the fuel rods and thimble tubes of the fuel cell in order to minimize the potential for self-induced vibration.

Another aspect of the present invention is to provide a grid having a plurality of strap members that each include a spring and at least a first dimple, with the springs and dimples each including a contoured surface shape that may include an embossment to reduce fretting wear between the grid and the fuel rods.

Another aspect of the present invention is to provide a strap member of a grid of a fuel assembly of a nuclear reactor having a spring apparatus that includes a spring member and a pair of legs, in which the legs extend nonlinearly between a pair of plates in order to increase the compliance of the spring apparatus.

In accordance with the foregoing, an aspect of the present invention is to provide a grid for use in a fuel assembly of a nuclear reactor, the general nature of which can be stated as including a plurality of first straps aligned with one another, a plurality of second straps aligned with one another, the first and second straps being connected with one another in a lattice to define a plurality of cells. A plurality of mixing vanes are disposed on the first and second straps, with each mixing vane including a free end and a connection end, and with the connection end forming a connection with one of the first and second straps. Each mixing vane includes a longitudinal axis defined thereon that extends between the connection end and the free end. An imaginary first grid axis and an imaginary second grid axis extend across the grid, with the first and second grid axes intersecting one another at a point of intersection to define a first grid quadrant, a second grid quadrant, a third grid quadrant, and a fourth grid quadrant on the grid that are separated from one another by the first and second axes. The cells are each generally of a cell width measured in a direction generally parallel with the second straps and of a cell height measured in a direction generally parallel with the first straps. The longitudinal axes of substantially all of the mixing vanes within a diagonally disposed pair of the first, second, third, and fourth grid quadrants that are spaced at least one-half the cell width from the first grid axis and at least one-half the cell height from the second grid axis extend in a direction generally parallel with one of an imaginary first alignment plane and an imaginary second alignment plane, with the first and second alignment planes each extending substantially perpendicular to a plane including the first and second grid axes. The longitudinal axes of substantially all of the mixing vanes within the other pair of the first, second, third, and fourth grid quadrants that are spaced at least one-half the cell width from the first grid axis and at least one-half the cell height from the second grid axis extend in a direction generally parallel with the other of the first and second alignment planes.

Another aspect of the present invention is to provide a fuel assembly for a nuclear reactor, the general nature of which can be stated as including at least a first grid and at least a first fuel rod engaged with the grid, and in which the general nature of the at least first grid can be stated as including a plurality of first straps aligned with one another, a plurality of second straps aligned with one another, the first and second straps being connected with one another in a lattice to define a plurality of cells. A plurality of mixing vanes are disposed on the first and second straps, with each mixing vane including a free end and a connection end, and with the connection end forming a connection with one of the first and second straps. Each mixing vane includes a longitudinal axis defined thereon that extends between the connection end and the free end. An imaginary first grid axis and an imaginary second grid axis extend across the grid, with the first and second grid axes intersecting one another at a point of intersection to define a first grid quadrant, a second grid quadrant, a third grid quadrant, and a fourth grid quadrant on the grid that are separated from one another by the first and second axes. The cells are each generally of a cell width measured in a direction generally parallel with the second straps and of a cell height measured in a direction generally parallel with the first straps. The longitudinal axes of substantially all of the mixing vanes within a diagonally disposed pair of the first, second, third, and fourth grid quadrants that are spaced at least one-half the cell width from the first grid axis and at least one-half the cell height from the second grid axis extend in a direction generally parallel with one of an imaginary first alignment plane and an imaginary second alignment plane, with the first and second alignment planes each extending substantially perpendicular to a plane including the first and second grid axes. The longitudinal axes of substantially all of the mixing vanes within the other pair of the first, second, third, and fourth grid quadrants that are spaced at least one-half the cell width from the first grid axis and at least one-half the cell height from the second grid axis extend in a direction generally parallel with the other of the first and second alignment planes.

Another aspect of the present invention is to provide a strap member of a grid of a fuel assembly of a nuclear reactor, the nuclear reactor including at least a first fuel rod, the general nature of which can be stated as including a first plate, the first plate including a first dimple, a second plate, the second plate including a second dimple, a spring apparatus including a spring member, a first leg, and a second leg, the first and second legs each extending nonlinearly between the first and second plates, the spring member extending between the first and second legs, the spring member including a spring plate and a pair of spring ligaments, the spring plate being interposed between the spring ligaments, and one of the spring ligaments being connected with the first leg, the other of the spring ligaments being connected with the second leg.

Another aspect of the present invention it to provide a fuel assembly for a nuclear reactor, the general nature of which can be stated as including at least a first fuel rod and at least a first grid, the at least first grid including a plurality of first straps aligned with one another and a plurality of second straps aligned with one another, the first and second straps being connected with one another in a lattice to define a plurality of cells, the at least first fuel rod being disposed in one of the cells, at least one of the first and second straps including a strap member including a first plate, a second plate, and a spring apparatus, the first plate including a first dimple, the second plate including a second dimple, the spring apparatus including a spring member, a first leg, and a second leg, the first and second legs each extending nonlinearly between the first and second plates, the spring member extending between the first and second legs, the spring member including a spring plate and a pair of spring ligaments, the spring plate being interposed between the spring ligaments, and one of the spring ligaments being connected with the first leg, the other of the spring ligaments being connected with the second leg.

BRIEF DESCRIPTION OF THE DRAWINGS

A further understanding of the invention can be gained from the following description of the preferred embodiment when read in conjunction with the accompanying drawings in which.

DESCRIPTION OF THE PREFERRED EMBODIMENTS

Figure 1:
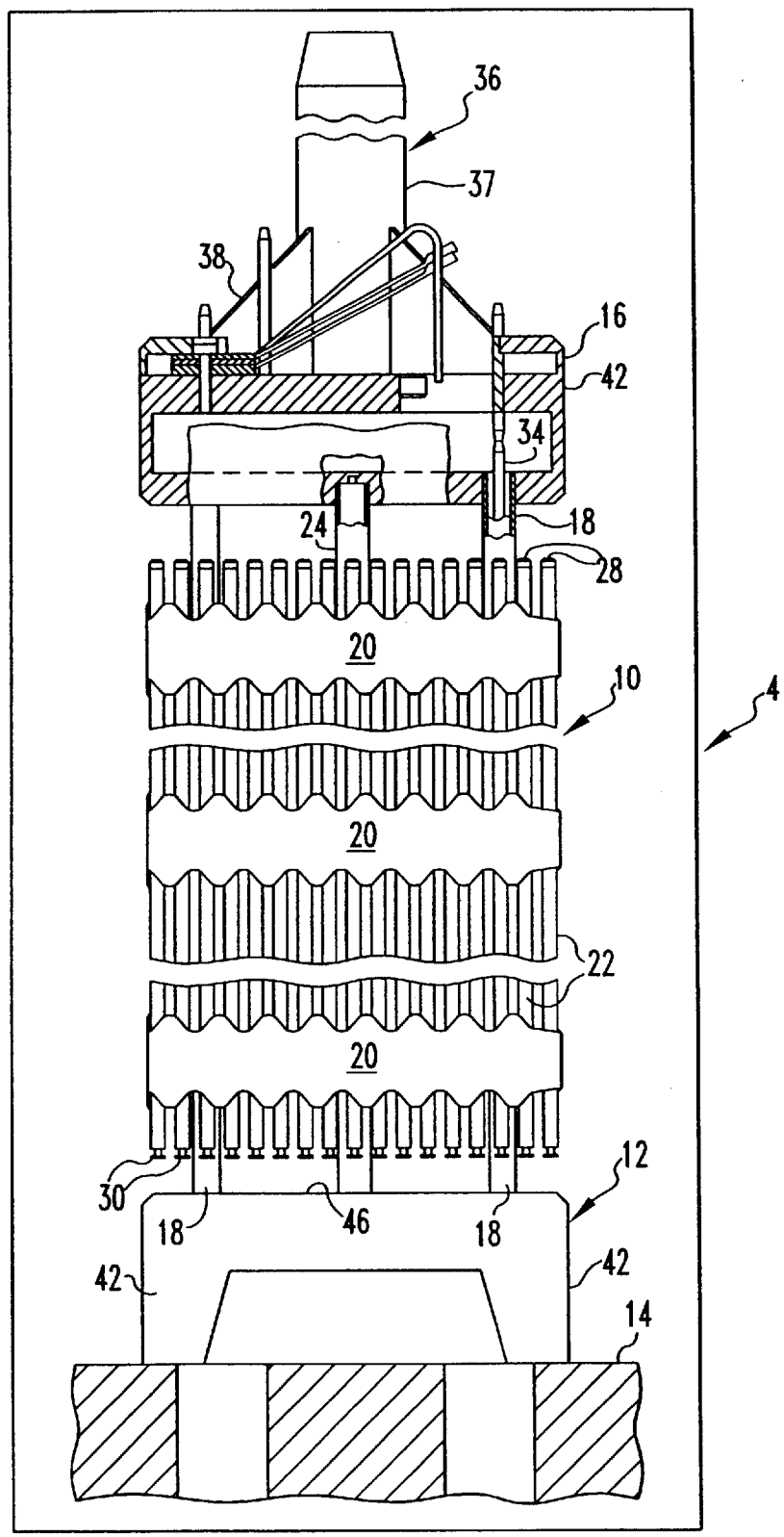
FIG. 1, is a schematic front elevational view of a nuclear reactor in accordance with the present invention.

A schematically depicted fuel assembly 10 mounted in schematically depicted nuclear reactor 4 is shown generally in FIG. 1. The fuel assembly 10 includes a plurality of grids 20 that are depicted, in whole or in part, in FIGS. 2–10. As will be set forth more fully below, the grids 20 are advantageously configured to minimize the unbalanced forces, moments, and torques applied to other components of the fuel assembly 10 as well as to reduce fretting wear between the grids 20 and other components of the fuel assembly 10.

A bottom nozzle 12 supports the fuel assembly 10 on a lower core support plate 14 in the core region of the nuclear reactor 4. The nuclear reactor 4 is a pressurized water reactor that includes a plurality of the fuel assemblies 10 disposed on the core support plate 14. In addition to the bottom nozzle 12, the structural skeleton of the fuel assembly 10 also includes a top nozzle 16 at its upper end and a number of elongated guide tubes or thimble tubes 18 which extend longitudinally between the bottom and top nozzles 12 and 16 and at opposite ends are connected therewith.

The fuel assembly 10 further includes a plurality of transverse grids 20 axially spaced along and mounted to the thimble tubes 18 and an organized array of elongated fuel rods 22 transversely spaced and supported by the grids 20. Also, the fuel assembly 10 has an instrumentation tube 24 located in the center thereof that extends between the bottom and top nozzles 12 and 16. With such an arrangement of parts, the fuel assembly 10 forms an integral unit capable of being conveniently handled without damaging the assembly parts.

As mentioned above, the fuel rods 22 in the array thereof in the fuel assembly 10 are held in spaced relationship with one another by the grids 20 spaced along the length of the fuel assembly 10. Each fuel rod 22 includes a plurality of nuclear fuel pellets and is closed at its opposite ends by upper and lower end plugs 28 and 30. The fuel pellets are composed of fissile material and are responsible for creating the thermal energy of the nuclear reactor 4.

A liquid moderator/coolant such as water, or water containing boron, is pumped upwardly through a plurality of flow openings in the lower core plate 14 to the fuel assembly 10. The bottom nozzle 12 of the fuel assembly 10 passes the coolant flow upwardly through the thimble tubes 18 and along the fuel rods 22 of the assembly in order to extract heat generated therein for the production of useful work.

To control the fission process, a number of control rods 34 are reciprocally movable in the thimble tubes 18 located at predetermined positions in the fuel assembly 10. Specifically, a rod cluster control mechanism 36 positioned above the top nozzle 16 supports the control rods 34. The control mechanism 36 has an internally threaded cylindrical member 37 with a plurality of radially extending arms 38. Each arm 38 is interconnected with a control rod 34 such that the control mechanism 36 is operable to move the control rods 34 vertically in the thimble tubes 18 to thereby control the fission process in the fuel assembly 10, all in a well-known manner.

Figures 2, 3:
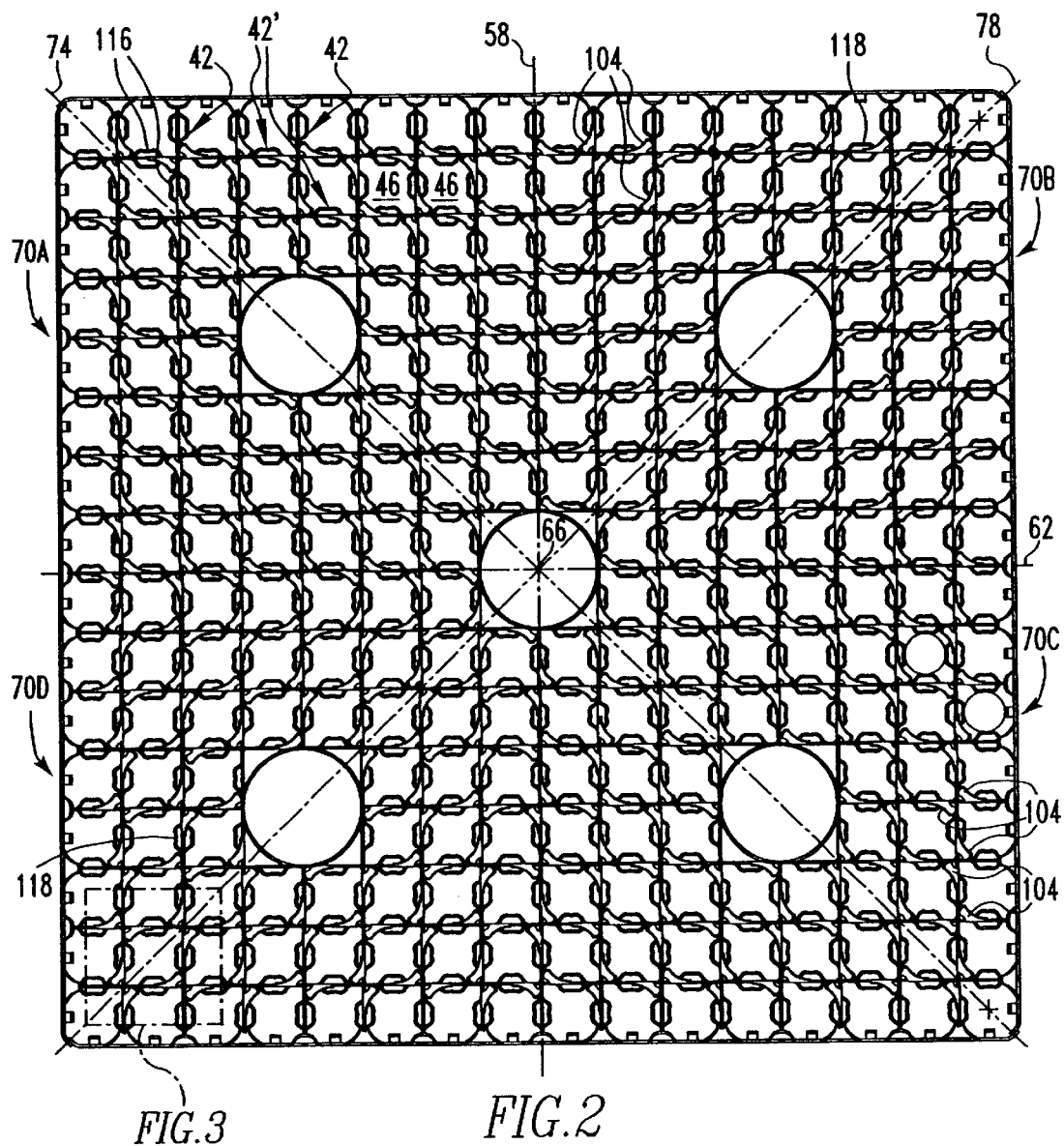
FIG. 2, is a top plan view of a grid of the nuclear reactor in accordance with the present invention.
FIG. 3, is an enlarged view of a portion of FIG. 2.
Figure 3:
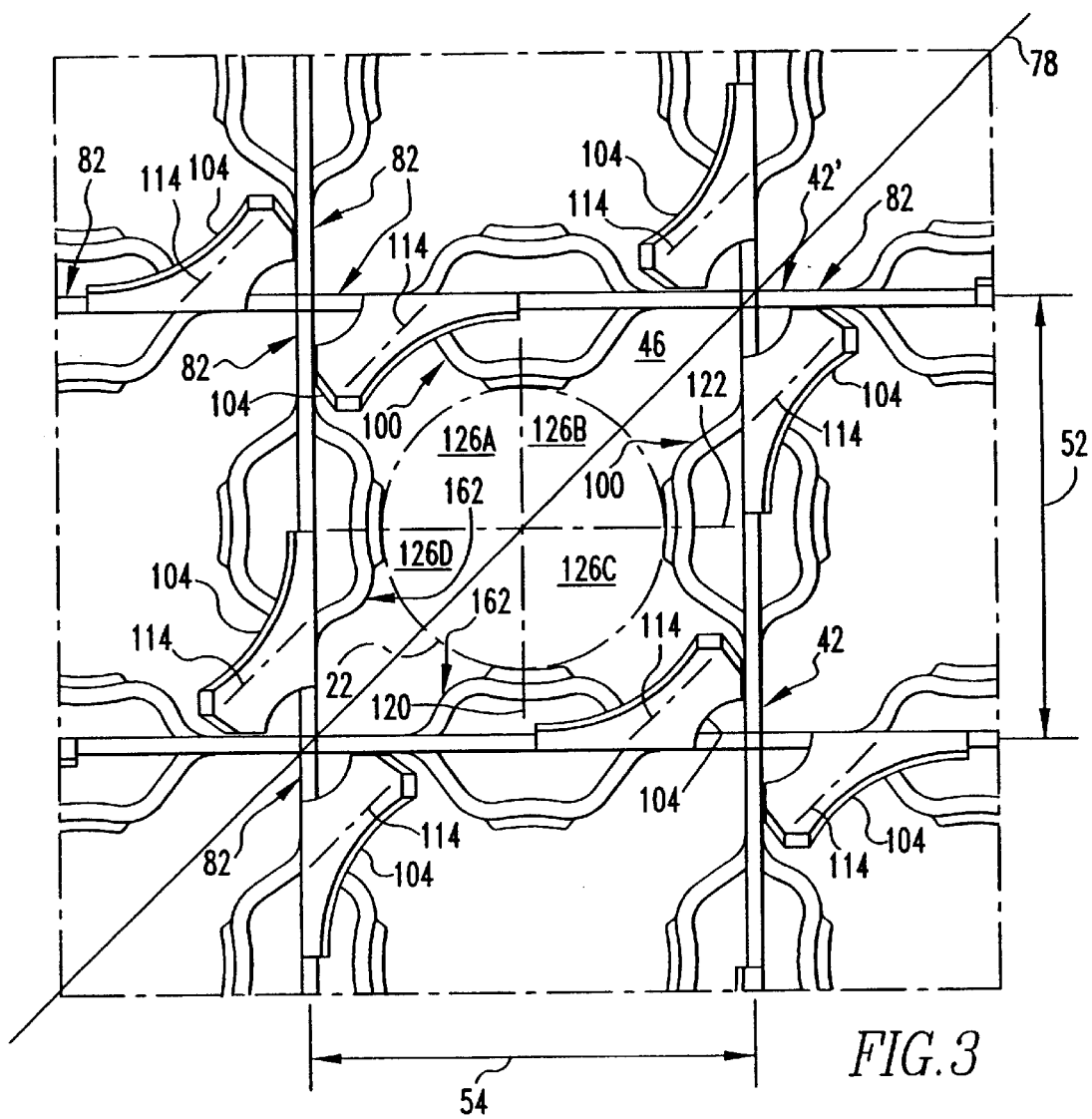

As can be seen in FIG. 2, each grid 20 includes a plurality of first straps 42 aligned with one another and a plurality of second straps 42' that are aligned with one another and are arranged substantially perpendicular to the first straps 42. The first and second straps 42 and 42' are connected with one another in a lattice fashion in a known manner and, as will be set forth more fully below, to define a plurality of cells 46. The cells 46 are configured to each receive a fuel rod 22 therein and to support the fuel rods 22 in the fuel assembly 10. The first and second straps 42 and 42' are also arranged to define relatively larger cells within which the thimble tubes 18 and the instrumentation tube 24 are disposed.

The grid 20 also includes an imaginary first grid axis 58 that extends substantially parallel with the first straps 42 and an imaginary second grid axis 62 that extends substantially parallel with the second straps 42'. The first and second grid axes 58 and 62 cross one another at a point of intersection 66 and are oriented substantially perpendicular with one another, although in other embodiments the first and second grid axes 58 and 62 may be oriented oblique to one another.

The first and second grid axes 58 and 62 define first, second, third, and fourth grid quadrants 70A, 70B, 70C, and 70D. In the exemplary grid 20 depicted generally in FIG. 2, the first and third grid quadrants 70A and 70C are disposed diagonal one another, as are the second and fourth grid quadrants 70B and 70D.

An imaginary first alignment plane 74 and an imaginary second alignment plane 78 extend through the grid 20 and out of the page of FIG. 2. The first and second alignment planes 74 and 78, in the example depicted in FIG. 2, are oriented perpendicular with one another and extend through the point of intersection 66. The first and second alignment planes 74 and 78 are also oriented substantially perpendicular with an imaginary grid plane that includes both the first and second grid axes 58 and 62 and is generally parallel with the plane of the page of FIG. 2. Stated otherwise, the first and second alignment planes 74 and 78 are oriented generally perpendicular to a plane defined by the grid 20. The first and second alignment planes 74 and 78 extend diagonally across the grid 20, with the first alignment plane 74 extending across the first and third grid quadrants 70A and 70C, and with the second alignment plane 78 extending diagonally across the second and fourth grid quadrants 70B and 70D.

It can be seen from FIG. 2 that the first grid axis 58 is in register with one of the first straps 42, meaning that it overlies the aforementioned first strap 42. Similarly, the second grid axis 62 can be seen to be in register with one of the second straps 42', meaning that it overlies the aforementioned second strap 42'. It is understood that other nuclear reactors may require grids that are of a generally different configuration than the grid 20 due to different configurations of the thimble tubes, instrumentation tube, and fuel rods. As such, in the event that the grid is configured to include an odd number of cells along either or both of the first and second grid axes 58 and 62, either or both or the first and second grid axes 58 and 62 may not be in register with any of the first and second straps 42 and 42', but nevertheless will be oriented in a direction generally parallel therewith, respectively.

FIG. 3 generally depicts an enlarged view of the indicated portion of FIG. 2, and additionally includes a fuel rod 22 disposed in the cell 46 depicted in FIG. 3. The cells 46 are generally each of a cell height 52 measured in direction generally parallel with the first straps 42. Similarly, the cells 46 are generally each of a cell width 54 measured in a direction generally parallel with the second straps 42'. While the dimensions of the cells 46 are indicated herein as being of a "height" and a "width", it is understood that when the grid 20 is installed in the nuclear reactor 4 the cell height and width 52 and 54 will be measured in a generally horizontal plane. As such, the terms "height" and "width" are not intended to be limiting in any fashion.

Figure 4:
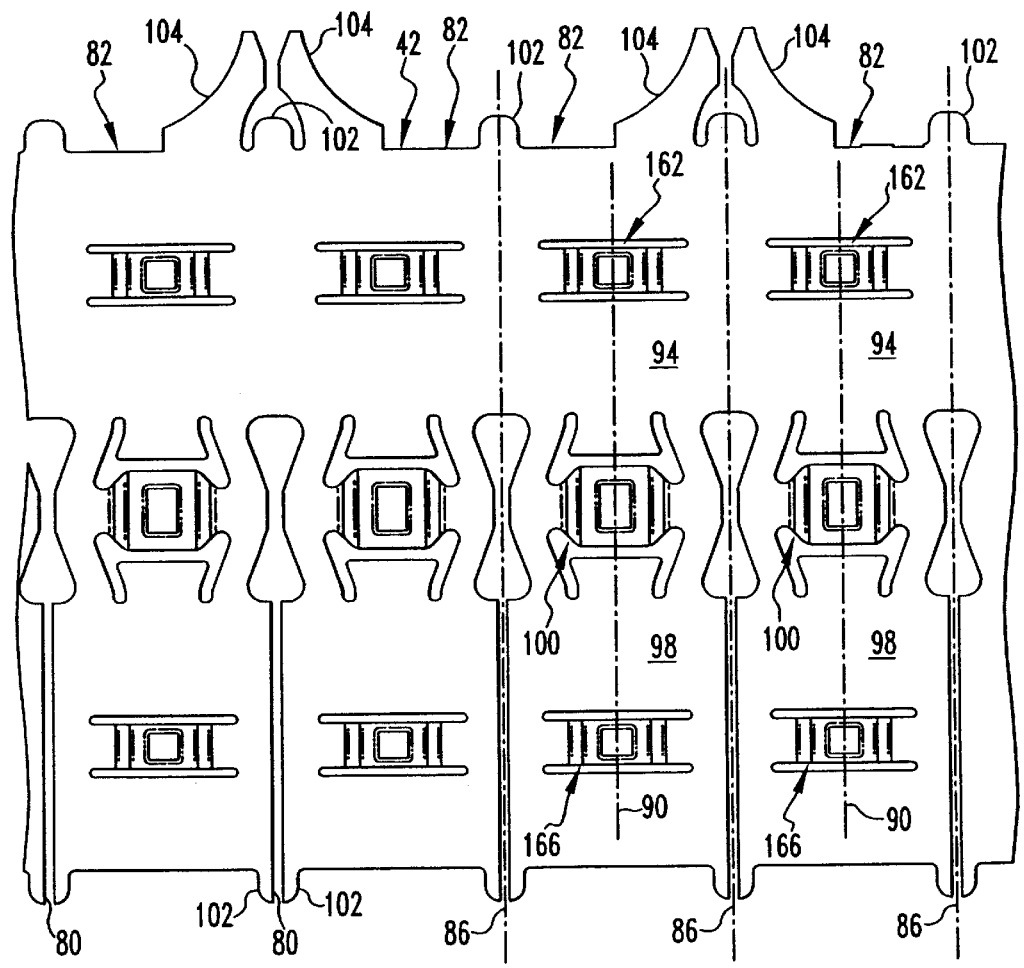
FIG. 4, is front elevational view of a portion of a first strap of the grid of the nuclear reactor

The first and second straps 42 and 42' are all formed of relatively thin elongated sheets of an appropriate metal such as a zirconium alloy or other appropriate material that is well suited to the environment within the fuel assembly 10. As is best shown in FIG. 4, the first straps 42 are formed with a plurality of parallel slots 80 that extend transversely through approximately one-half of the first strap 42 along one side thereof. Each first strap 42 includes a plurality of strap members 82 that are generally defined by the slots 80 but are more specifically defined by a plurality of imaginary dividing lines 86 that extend transversely along the first straps 42 and overlie the slots 80. Each strap member 82 includes a central axis 90 defined thereon that is parallel with and spaced midway between the dividing lines 86 that define the strap member 82.

Figure 4A:
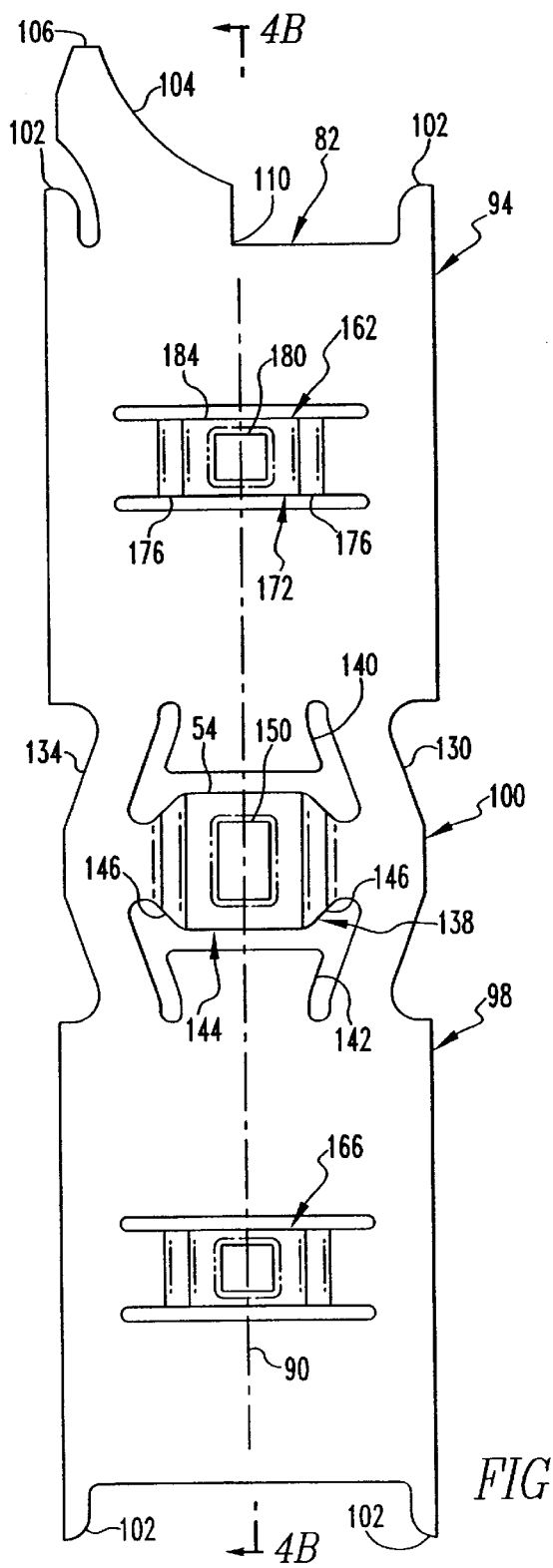
FIG. 4A is a front elevational view of a strap member of the aforementioned first strap.

As is best shown in FIG. 4A, each strap member 82 includes a first plate 94, a second plate 98 and a spring apparatus 100. The spring apparatus 100 is generally interposed between the first and second plates 94 and 98. When the grid 20 is installed in nuclear reactor 4, the first plates 94 will be disposed generally vertically above the second plates 98. It can be seen that the second plates 98 are generally defined by the slots 80, while the first plates 94 are defined generally by the dividing lines 86.

Figure 5:
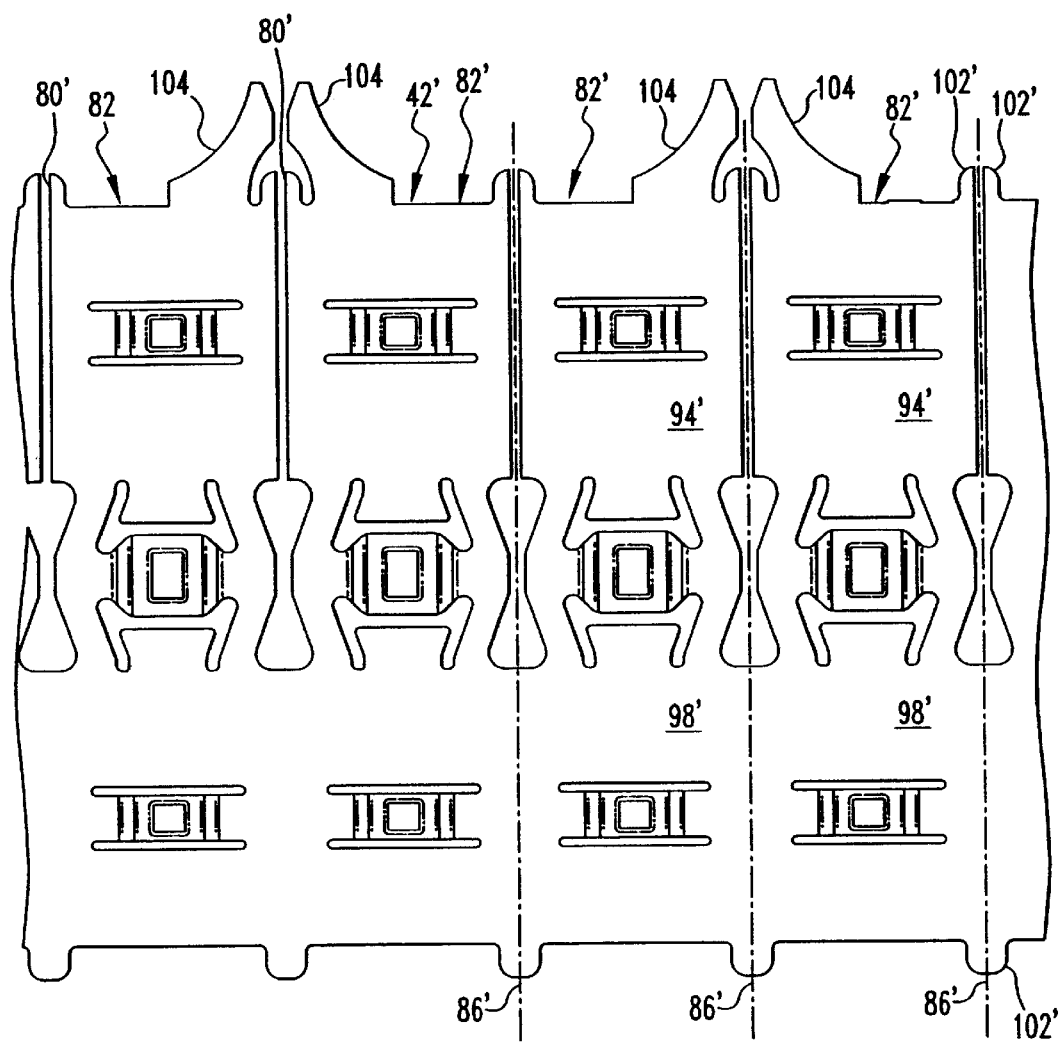
FIG. 5, is a front elevational view of a portion of a second strap of the grid of the nuclear reactor;.
Figure 6:
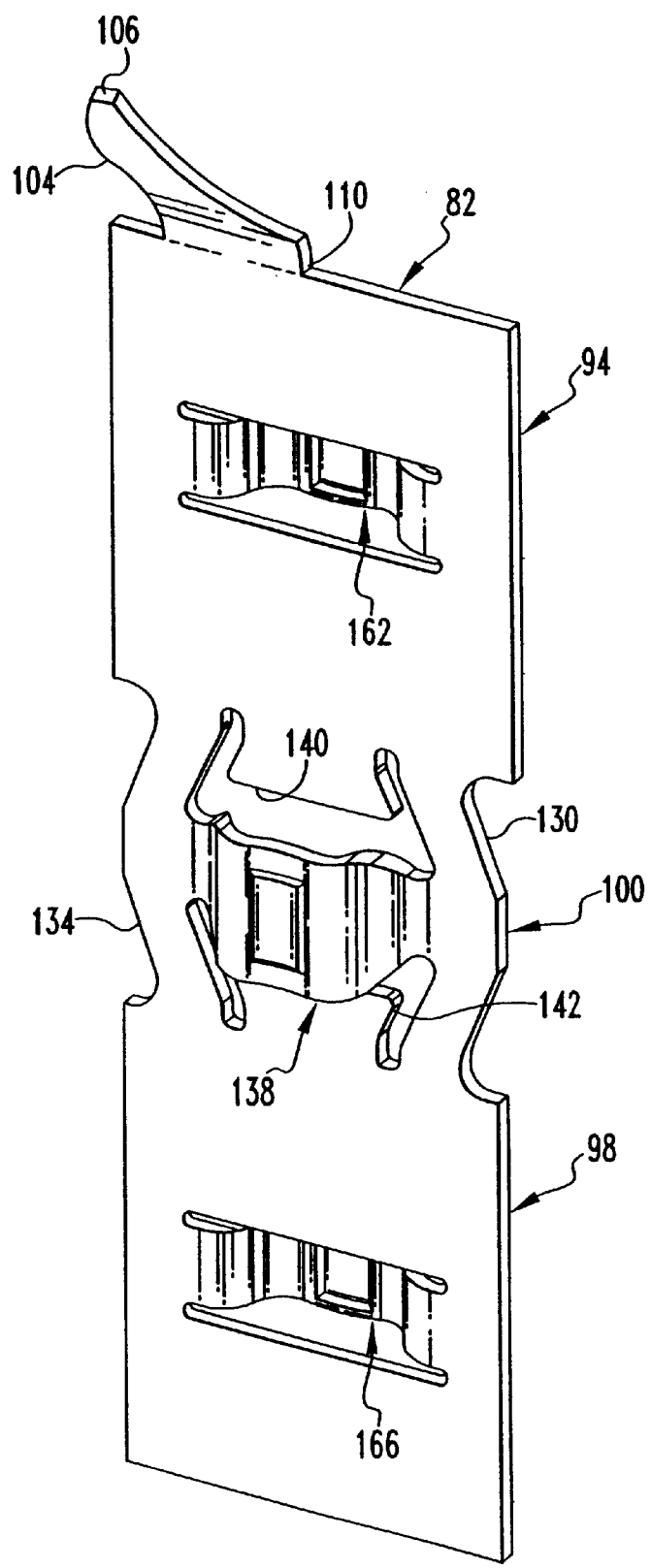
FIG. 6, is an isometric front elevational view of the strap member that is depicted generally in FIGS. 4A and 4B.
Figure 7:
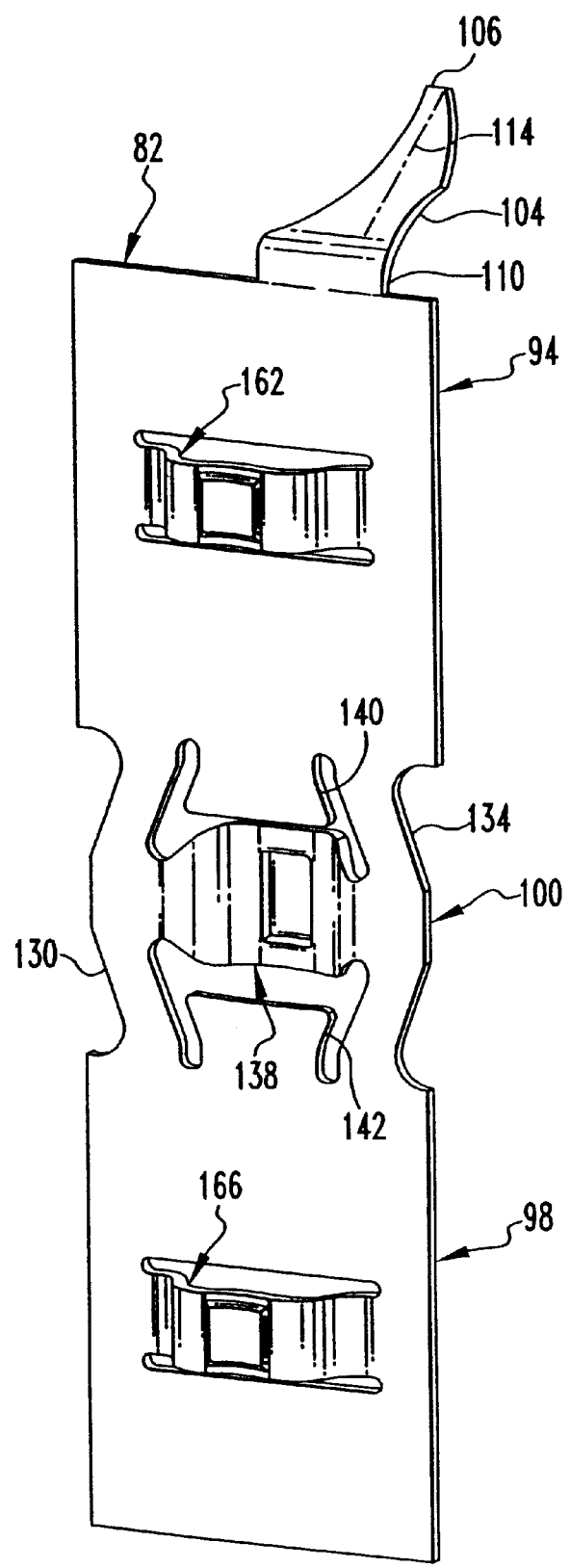
FIG. 7, is an isometric rear elevational view of the strap member of FIG. 6.
Figure 8:
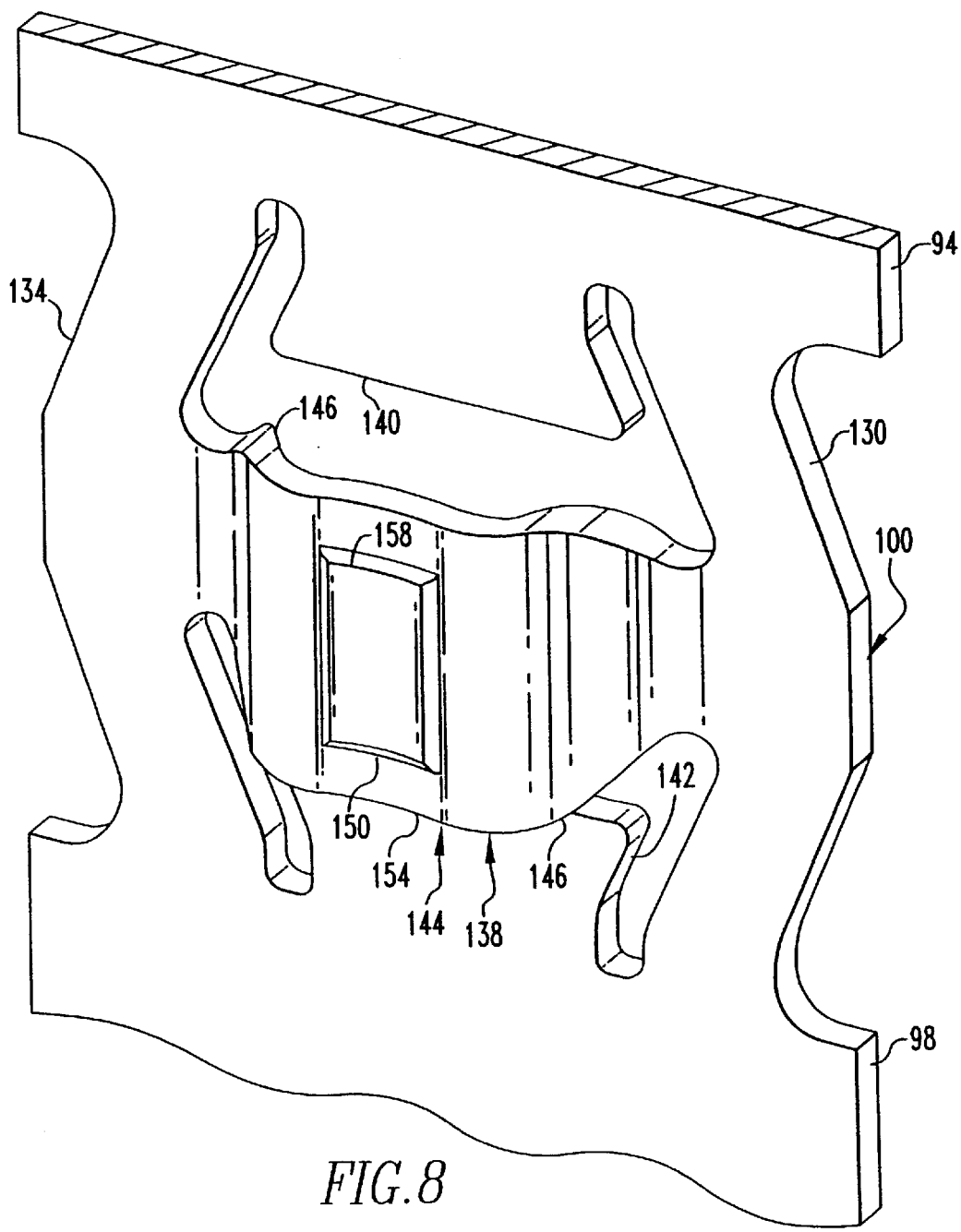
FIG. 8, is an enlarged view of a portion of FIG. 6.
Figure 9:
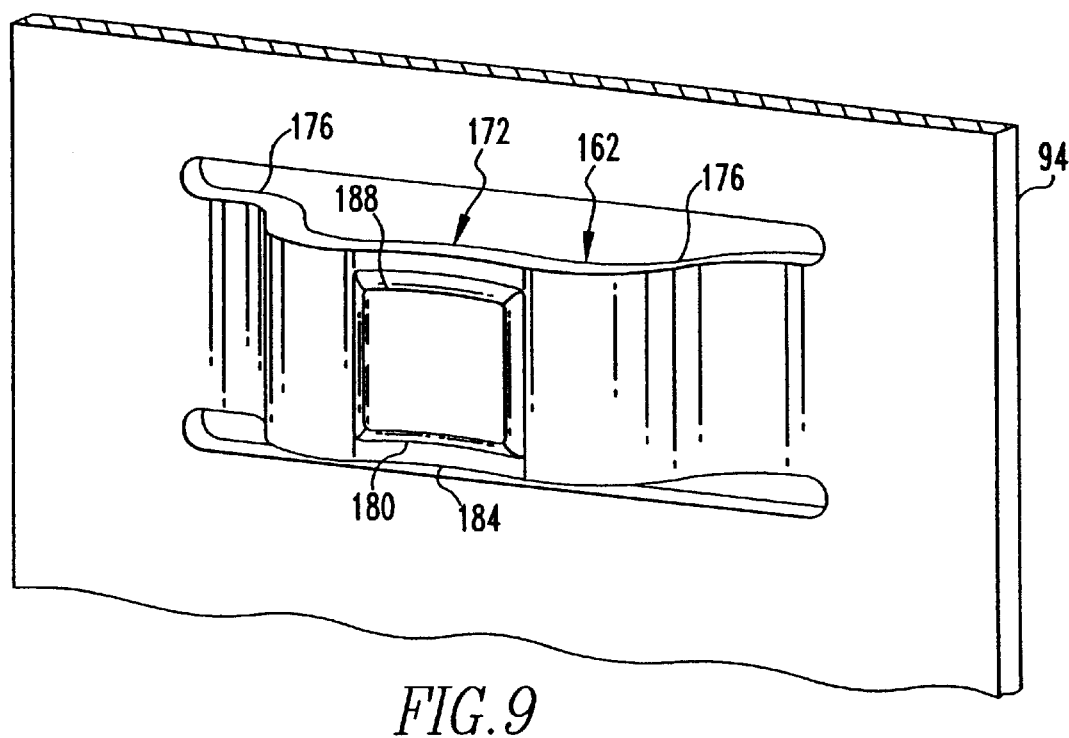
FIG. 9, is an enlarged view of a portion of FIG. 7.

As can be seen in FIG. 5, the second straps 42' are similar to the first straps 42, except that the slots 80' are formed in the opposite side of the second straps 42'. More specifically, while each second strap 42' includes a plurality of strap members 82', the first plates 94' are defined generally by slots 80', and the second plates 98' are defined generally by the dividing lines 86'.

In order to assemble the grids 20, the slots 80 of the first straps 42 are received in the slots 80' of the second straps 42' such that the first and second straps 42 and 42' are engaged with one another in a lattice fashion to define the cells 46. The first and second straps 42 and 42' are held temporarily in such a position by an appropriately configured fixture (not shown.) The first and second straps 42 and 42' are then fixedly connected with one another by laser welding or by otherwise connecting together a plurality of welding tabs 102 on the first straps 42 with a plurality of correspondingly positioned welding tabs 102' on the second straps 42'. Since the second straps 42' are substantially similar to the first straps 42 except for the opposite positioning of the slots 80 and 80', the specific configuration of the second straps 42' will be discussed no further herein, it being understood that the following details related to the first straps 42 are equally applicable to the second straps 42'.

Most every first plate 94 includes a mixing vane 104 disposed thereon and extending at an oblique angle (FIG. 4B) from a plane defined by the second plates 98. In this regard, it is understood that a number of the first plates 94 adjacent the perimeter straps or adjacent the cells within which the instrumentation tube 24 or the thimble tubes 18 are disposed, as well as some other first plates 94, may not include a mixing vane 104.

Each mixing vane 104 includes a connection end 110 connected with the first plate 94 and a free end 106 opposite the connection end 110. Each mixing vane 104 also includes an imaginary longitudinal axis 114 (FIG. 7) extending between the free end 106 and the connection end 110. As can be understood from FIG. 3, each longitudinal axis 114 is advantageously oriented generally parallel with one of the first and second alignment planes 74 and 78.

As can be best understood from FIG. 2, each of the first, second, third, and fourth quadrants 70A, 70B, 70C, and 70D includes substantially the same number of mixing vanes 104. As indicated above, in the exemplary grid 20 depicted in FIG. 2, the first grid axis 58 is in register with one of the first straps 42, and the second grid axis 62 is in register with one of the second straps 42'. For the exemplary grid 20 depicted in FIG. 2, therefore, the specific number of mixing vanes 104 within any of the first, second, third, and fourth quadrants 70A, 70B, 70C, and 70D, are considered to be those mixing vanes 104 that are disposed at least one-half the cell width 54 from the first grid axis 58 and at least one-half the cell height 52 from the second grid axis 62.

It can therefore be seen that the mixing vanes 104 that are within one of the first, second, third, and fourth quadrants 70A, 70B, 70C, and 70D, as thusly defined immediately above, are oriented generally parallel with whichever of the first and second alignment planes 74 and 78 that extend through the quadrant. For instance, the mixing vanes 104 that are within the first and third quadrants 70A and 70C are aligned in a direction generally parallel with one another and with the first alignment plane 74. The first and third grid quadrants 70A and 70C are also diagonally disposed with respect to one another on the grid 20. Similarly, the mixing vanes 104 within the second and fourth grid quadrants 70B and 70D are all generally aligned parallel with one another and with the second alignment plane 78. Likewise, the second and fourth grid quadrants 70B and 70D are diagonally disposed with respect to one another on the grid 20. Those mixing vanes 104 that are not strictly disposed "within" one of the first, second, third, and fourth quadrants 70A, 70B, 70C, and 70D, meaning those mixing vanes 104 that are disposed on the first strap 42 and the second strap 42' that are in register with the first grid axis 58 and the second grid axis 62, respectively, are all aligned generally parallel with one another and with the first alignment plane 74. In other embodiments of the grid 20, such mixing vanes 104 disposed on the aforementioned first and second straps 42 and 42' may potentially be aligned generally parallel with one another and in a direction generally parallel with the second alignment plane 78.

It can be seen that most of the first and second straps 42 and 42' include a first portion 116 and a second portion 118 (numbered in a limited fashion in FIG. 2) that are defined on opposite sides of the first grid axis 58 or the second grid axis 62, whichever is appropriate depending upon the alignment of the specific strap. It can be seen that the mixing vanes 104 disposed on the first portion 116 of any given first or second strap 42 and 42' are aligned generally parallel with one another and with one of the first and second alignment planes 74 and 78. Similarly, the mixing vanes 104 disposed along the second portion 118 of the given strap are oriented generally parallel with one another and with the other of the first and second alignment planes 74 and 78.

It can be understood from FIGS. 2 and 4 that the mixing vanes 104 of adjacent strap members 82 are opposed to one another or are mirror images of one another. It can be understood from FIG. 2 that, as a general matter, such opposed or mirror-image mixing vanes 104 also extend outwardly in opposite directions from the plane of the first strap 42 defined by the second plates 98. In this regard, it can be seen that the mixing vanes 104 that are disposed on the first portion 116 of any given strap alternately extend outwardly in opposite directions with respect to the second plates 98, and the mixing vanes 104 that are disposed on the second portion 118 of the given strap similarly alternately extend outwardly in opposite directions from the plane of the strap 42 defined by the second plates 98.

As is best shown in FIG. 3, each cell 46 includes an imaginary first cell axis 120 and an imaginary second cell axis 122 that are aligned perpendicular with one another and that define first, second, third, and fourth cell quadrants 126A, 126B, 126C, and 126D. In the exemplary grid 20 of FIG. 2 and the exemplary cell 46 depicted in FIG. 3, the first and third cell quadrants 126A and 126C are diagonally disposed with respect to one another in the cell 46, and the second and fourth cell quadrants 126B and 126D are diagonally disposed with respect to one another. As can be seen in FIGS. 2 and 3, all of the cells 46 except those adjacent one of the first and second grid axes 58 and 62 or adjacent the perimeter of the grid 20 include a pair of mixing vanes 104 disposed in diagonally opposed cell quadrants.

By configuring the grid 20 in the aforementioned fashion, the hydraulic reaction forces resulting in the mixing vanes 104 by the water impinging thereon during operation of the nuclear reactor 4 do not result in a net torque, moment, or transverse force on the grid 20 that is applied to the thimble tubes 18, the instrumentation tube 24, or the fuel rods 22. Such reaction forces at most provide only a general force applied longitudinally to the thimble tubes 18 and the fuel rods 22. It is understood, however, that all of the aforementioned teachings regarding the interrelationships among the mixing vanes 104 need not always be applied in all circumstances to achieve the beneficial aspects of the present invention. Rather, the beneficial aspects of the present invention whereby no extraneous forces or torques are applied to the thimble tubes 18, the instrumentation tube 24, and the fuel rods 22 potentially can be achieved by employing fewer than all of the aforementioned teachings. Varying combinations of such teachings of such interrelationships among the mixing vanes 104 can vary with the specific configuration of the grids, the layout and numbering of the fuel rods 22, as well as other factors.

As is best shown in FIGS. 4A and 6–8, each spring apparatus 100 includes a first leg 130, a second leg 134, and a spring member 138. The first and second legs 130 and 134 each extend nonlinearly between the first and second plates 94 and 98. The spring member 138 is interposed between the first and second leg members 130 and 134 at approximately the midpoint of each. By stating that the first and second legs 130 and 134 extend "nonlinearly", it is meant to be expressed that in extending between the first and second plates 94 and 98, the first and second legs 130 and 134 extend at least partially in a direction away from the central axis 90 and/or at least partially in a direction toward the central axis 90. Such nonlinearity of the first and second legs 130 and 134 increases the compliance thereof, as will be set forth more fully below.

It can also be seen that the first plate 94 includes a first lug 140 disposed between the first and second legs 130 and 134. Similarly, the second plate includes a second lug 142 that is disposed between the first and second legs 130 and 134. Depending upon the specific configuration of the grid 20, the first and second lugs 140 and 142 may be shortened or eliminated depending upon the extent to which it is desired to permit water to flow between the first and second legs 130 and 134.

The spring member 138 includes a spring plate 144 that is interposed between a pair of spring ligaments 146. The spring ligaments 146 each are connected with the spring plate 144, with one of the spring ligaments 146 being connected with the first leg 130, and the other of the spring ligaments 146 being connected the second leg 134.

The spring plate 144 includes a spring embossment 150 that protrudes outwardly from a spring perimeter frame 154. The spring embossment 150 is advantageously configured to include a spring contour 158 that is defined to extend along the spring embossment 150, whereby the spring embossment 150 can be generally stated to be contoured. The edges of the spring embossment 150 preferably are also beveled or otherwise rounded to resist fretting wear on the fuel rods 22.

It can be seen that the first plate 94 is formed to include a first dimple 162, and that the second plate 98 is formed to include a second dimple 166. Since the first and second dimples 162 and 166 are substantially identical, the second dimple 166 will be discussed in detail no further, it being understood that the following description is equally applicable to both the first and second dimples 162 and 166.

The first dimple 162 includes a dimple plate 172 disposed between a pair of dimple ligaments 176. The dimple plate 172 and the dimple ligaments 176 are generally noncoplanar with the rest of the first plate 94. The dimple plate 172 includes a dimple embossment 180 that protrudes outwardly from a dimple perimeter frame 184. The dimple embossment 180 is advantageously configured to include a dimple contour 188 that extends generally along the dimple embossment 180, whereby the dimple embossment 180 can be generally stated as being contoured. The edges of the dimple embossments 180 are beveled or otherwise curved to reduce fretting wear with the fuel rods 22.

When the grid 20 is installed into the reactor 4, the spring ligaments 146 and the dimple ligaments 176 all extend in a direction generally transverse to the longitudinal extent of the fuel rods 22, and as indicated above the spring plates 144 and the dimple plates 172 are contoured. As such, in the event that the fuel rods 22 vibrate during operation of the reactor 4 and experiences an off-normal impact with the spring plates 144 and the dimple plates 172, the spring ligaments 146 and dimple ligaments 176 closest to the off-normal impact will deflect to a greater degree than the spring ligaments 146 and dimple ligaments 176 relatively farther away from the off-normal impact. As such, the transverse orientation of the spring ligaments 146 and the dimple ligaments 176 with respect to the fuel rods 22, along with the contoured nature of the spring plates 144 and the dimple plates 172, causes individual spring ligaments 146 and dimple ligaments 176 to be relatively more compliant that the spring apparatuses 100 and the first and second dimples 162 and 166 as a whole, which reduces wear on the fuel rods 22 in the event of off-normal impacts.

Additionally, by configuring the spring plates 144 and the dimple plates 172 to be contoured to conform with the outer surface of the fuel rods 22, repeated off-normal impacts at different locations on the spring apparatuses 100 and the first and second dimples 162 and 166 advantageously result in corresponding impacts and wear at numerous transverse locations on the fuel rods 22, instead of resulting in impacts and wear at a single location on the fuel rods, which likely would be the case if the spring apparatuses 100 and the first and second dimples 162 and 166 were planar in configuration. Such spreading out of the wear on the fuel rods 22 due to off-normal impacts increases the wear-life of the fuel rods 22.

Figure 4B:
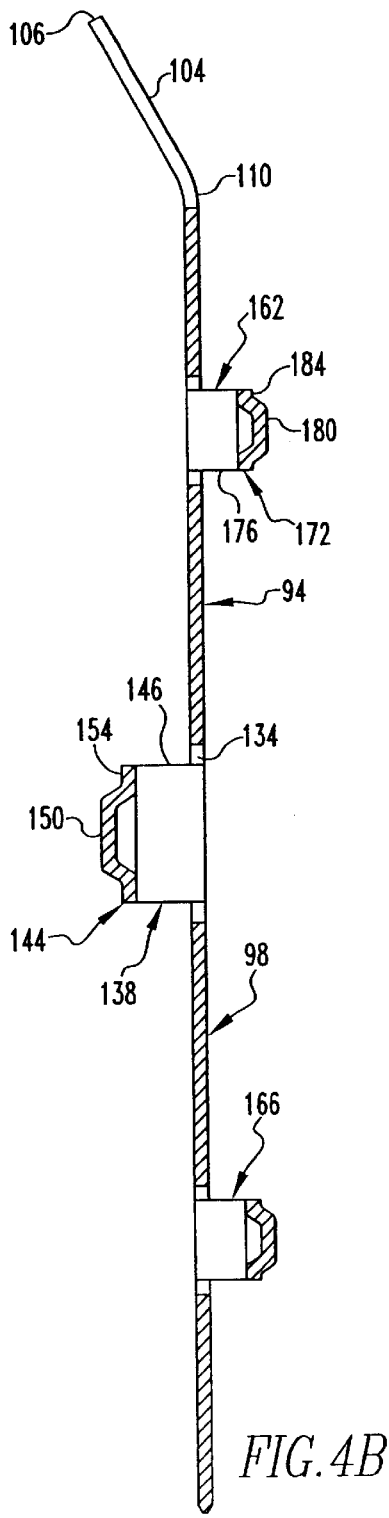
FIG. 4B, is a sectional view as taken along line 4B—4B of FIG. 4A.

As can be understood from FIG. 4B, the first and second dimples 162 and 166 of any given strap member 82 protrude outwardly from a plane defined generally by the first and second plates 94 and 98 in a direction opposite that of the spring apparatus 100. As such, as can be understood from FIG. 3, each cell 46 includes a pair of spring apparatuses 100 and pairs of both first and second dimples 162 and 166. A fuel rod 22 is received against the aforementioned pairs of spring apparatuses 100, first dimple 162, and second dimples 166.

In inserting the fuel rods 22 into the cells 46, the spring apparatuses 100 are changed from a relaxed state to a non-relaxed state. As a general matter, the spring apparatuses 100 are more compliant than the first and second dimples 162 and 166. Compliance of the spring apparatuses 100 is enhanced by the nonlinearity of the first and second legs 130 and 134 thereof and can be optimized by specifically configuring the lengths and widths of the first and second legs 130 and 134. It can be seen that the portions of the first and second legs 130 and 134 connected with the spring ligaments 146 are spaced farther from the central axis 90 than the portions of the first and second legs 130 and 134 that are connected with the first and second plates 94 and 98.

When the spring apparatuses 100 are in the relaxed state, it can be seen that the first and second legs 130 and 134 are generally coplanar with the first and second plates 94 and 98. In the relaxed condition of the spring apparatuses 100, however, it can be seen that the spring plate 144 and the spring ligaments 146 are generally non-coplanar with the first and second plates 94 and 98.

Figure 10:
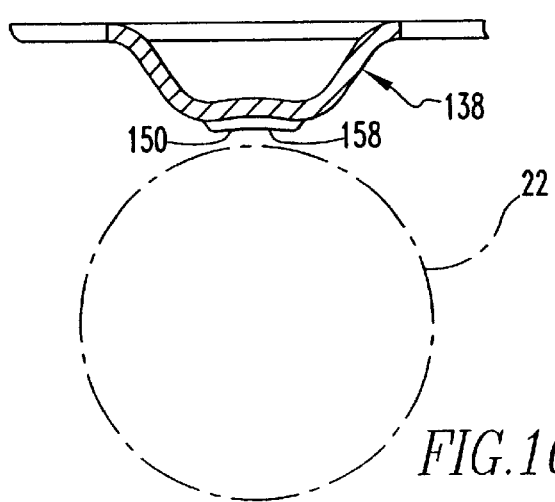
FIG. 10, is an enlarged sectional plan view of a portion of a strap member. Similar numerals refer to similar parts throughout the specification.

The spring apparatus is depicted generally in the relaxed state in FIG. 10. FIG. 10 also depicts a fuel rod 22 that is spaced from, and thus not in contact with, the spring apparatus 100. It can be seen that the spring contour 158 of the spring embossment 150 in the relaxed condition has a greater radius of curvature than the radius of the fuel rod 22. With such an advantageous configuration, when the fuel rod 22 is disposed in the cell 46 and is thus engaged with the spring embossment 150 such that the spring apparatus 100 is in the non-relaxed condition, the spring contour 158 becomes flexed by the fuel rod 22 such that the radius of curvature of the spring contour 158 matches the radius of the fuel rod 22 whereby the spring embossment 150 complementarily engages the fuel rod 22. By configuring the spring contour 158 to have a greater radius of curvature in the relaxed condition than the radius of the fuel rod 22, the resulting complementary engagement of the spring contour 158 and the fuel rod 122 when the fuel rod 22 is received in the cell 46 maximizes the area of contact between the spring embossment 150 and the fuel rod 22. Such maximization of the contact area between the spring embossment 150 and the fuel rod 22 reduces the stress therebetween and thus the potential for fretting wear. Moreover, to the extent that any fretting wear occurs at a region of reduced contact area between the grid 20 and the fuel rod 22, the conformal shape of the spring contour 158 results in such fretting being rapidly attenuated by resultingly increased surface contact area between the grid 20 and the fuel rod 22

The dimple embossments 180, each being configured with a dimple contour 188, are similarly configured to have a radius of curvature in the relaxed condition that is greater than the radius of the fuel rod 22. When the fuel rod 22 is received in the cell 46, the dimple embossment 180 in the non-relaxed condition complementarily engaged the fuel rod 22 to advantageously maximize the area of surface contact therebetween and minimize stresses therebetween and the potential for fretting wear.

It thus can be seen that by configuring the spring embossments 150 and the dimple embossments 180 to be contoured as set forth above, with the radius of curvature thereof in the relaxed condition being greater than the radius of the fuel rod 22, the spring embossments 150 and dimple embossments 180 complementarily engage the fuel rods 22 in the non-relaxed condition to maximize the area surface contact therebetween. By maximizing the area of surface contact therebetween as set forth above, the magnitude of stress therebetween is correspondingly reduced, as is the potential for fretting wear of the fuel rods 22.

It is understood, however, that a grid could be configured such that the spring plate 144 does not include the spring embossment 150, with the spring plate 144 being contoured to include the spring contour 158. In such a configuration, the dimple plate 172 would similarly be configured without the dimple embossment 180, whereby the dimple plate 172 would be contoured to include the dimple contour 188 thereon. Such a configuration would not depart from the concept of the present invention. Alternatively, a grid could be configured without any mixing vanes 104 without departing from the concept of the present invention.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A strap member of a grid of a fuel assembly of a nuclear reactor, the nuclear reactor including at least a first fuel rod, the strap member comprising:

a first plate;

the first plate including a first dimple;

a second plate;

the second plate including a second dimple;

a spring apparatus including a spring member, a first leg, and a second leg, the first and second legs each extending nonlinearly between the first and second plates;

the first and second legs being generally coplanar with the first and second plates when the spring apparatus is in a relaxed state;

the spring member extending between the first and second legs; and the spring member including a spring plate and a pair of spring ligaments, the spring plate being interposed between the spring ligaments, one of the spring ligaments being connected with the first leg, the other of the spring ligaments being connected with the second leg.

2. The strap member as set forth in claim 1, in which the spring plate is shaped to include a spring contour, the spring contour being structured to substantially complementarily engage the fuel rod.

3. The strap member as set forth in claim 2, in which the spring plate includes a spring embossment and a spring perimeter frame, the spring embossment protruding from the spring perimeter frame, the spring contour extending along the spring embossment, the spring embossment being structured to substantially complementarily engage the fuel rod.

4. The strap member as set forth in claim 2, in which the first and second dimples each include a dimple plate and a pair of dimple ligaments, the dimple plates each being shaped to include a dimple contour, the dimple contour being structured to substantially complementarily engage the fuel rod.

5. The strap member as set forth in claim 4, in which the spring plate includes a spring embossment and a spring perimeter frame, the spring embossment protruding from the spring perimeter frame, the spring contour extending along the spring embossment, the spring embossment being structured to substantially complementarily engage the fuel rod, and in which each dimple plate includes a dimple embossment and a dimple perimeter frame, the dimple embossments protruding from the dimple perimeter frames, the dimple contours extending along the dimple embossments, the dimple embossments being structured to substantially complementarily engage the fuel rod.

6. The strap member as set forth in claim 1, in which the spring plate and the pair of spring ligaments are substantially non-coplanar with the first and second plates when the spring apparatus is in the relaxed state.

7. The strap member as set forth in claim 1, in which the strap member includes a central axis extending along the spring apparatus and the first and second plates, and in which the portions of the first and second legs connected with the spring ligaments are spaced farther from the central axis than the portions of the first and second legs connected with the first and second plates.

8. A fuel assembly for a nuclear reactor, the fuel assembly comprising:

at least a first fuel rod; and at least a first grid;

the at least first grid including a plurality of first straps aligned with one another and a plurality of second straps aligned with one another, the first and second straps being connected with one another in a lattice to define a plurality of cells;

the at least first fuel rod being disposed in one of the cells;

at least one of the first and second straps including a strap member including a first plate, a second plate, and a spring apparatus;

the first plate including a first dimple;

the second plate including a second dimple;

the spring apparatus including a spring member, a first leg, and a second leg;

the first and second legs each extending nonlinearly between the first and second plates;

the first and second legs being generally coplanar with the first and second plates when the spring apparatus is in a relaxed state;

the spring member extending between the first and second legs; and the spring member including a spring plate and a pair of spring ligaments, the spring plate being interposed between the spring ligaments, one of the spring ligaments being connected with the first leg, the other of the spring ligaments being connected with the second leg.

9. The fuel assembly as set forth in claim 8, in which the spring plate is shaped to include a spring contour that substantially complementarily engages the fuel rod.

10. The fuel assembly as set forth in claim 9, in which the spring plate includes a spring embossment and a spring perimeter frame, the spring embossment protruding from the spring perimeter frame, the spring contour extending along the spring embossment, the spring embossment substantially complementarily engaging the fuel rod.

11. The fuel assembly as set forth in claim 9, in which the first and second dimples each include a dimple plate and a pair of dimple ligaments, the dimple plates each being shaped to include a dimple contour, the dimple contour substantially complementarily engaging the fuel rod.

12. The fuel assembly as set forth in claim 11, in which the spring plate includes a spring embossment and a spring perimeter frame, the spring embossment protruding from the spring perimeter frame, the spring contour extending along the spring embossment, the spring embossment substantially complementarily engaging the fuel rod, and in which each dimple plate includes a dimple embossment and a dimple perimeter frame, the dimple embossments protruding from the dimple perimeter frames, the dimple contours extending along the dimple embossments, the dimple embossments substantially complementarily engaging the fuel rod.

13. The fuel assembly as set forth in claim 8, in which the spring plate and the pair of spring ligaments are substantially non-coplanar with the first and second plates when the spring apparatus is in the relaxed state.

14. The fuel assembly as set forth in claim 8, in which the strap member includes a central axis extending along the spring apparatus and the first and second plates, and in which the portions of the first and second legs connected with the spring ligaments are spaced farther from the central axis than the portions of the first and second legs connected with the first and second plates.

15. A fuel assembly for a nuclear reactor, the fuel assembly comprising:

at least a first fuel rod; and at least a first grid;

the at least first grid including a plurality of first straps aligned with one another and a plurality of second straps aligned with one another, the first and second straps being connected with one another in a lattice to define a plurality of cells;

the at least first fuel rod being disposed in one of the cells;

at least one of the first and second straps including a strap member including a first plate, a second plate, and a spring apparatus;

the first plate including a first dimple;

the second plate including a second dimple;

the spring apparatus including a spring member, a first leg, and a second leg;

the first and second legs each extending nonlinearly between the first and second plates;

the spring member extending between the first and second legs;

the spring member including a spring plate and a pair of spring ligaments, the spring plate being interposed between the spring ligaments, one of the spring ligaments being connected with the first leg, the other of the spring ligaments being connected with the second leg;

the spring plate being shaped to include a spring contour that substantially complementarily engages the fuel rod; and in which the spring contour is generally of a spring radius when the spring apparatus is in a relaxed condition, and in which the at least first fuel rod is of a fuel rod radius, the spring radius being greater than the fuel rod radius.

16. A fuel assembly for a nuclear reactor, the fuel assembly comprising:

at least a first fuel rod; and at least a first grid;

the at least first grid including a plurality of first straps aligned with one another and a plurality of second straps aligned with one another, the first and second straps being connected with one another in a lattice to define a plurality of cells;

the at least first fuel rod being disposed in one of the cells;

at least one of the first and second straps including a strap member including a first plate, a second plate, and a spring apparatus;

the first plate including a first dimple;

the second plate including a second dimple;

the spring apparatus including a spring member, a first leg, and a second leg;

the first and second legs each extending nonlinearly between the first and second plates;

the spring member extending between the first and second legs;

the spring member including a spring plate and a pair of spring ligaments, the spring plate being interposed between the spring ligaments, one of the spring ligaments being connected with the first leg, the other of the spring ligaments being connected with the second leg;

the spring plate being shaped to include a spring contour that substantially complimentarily engages the fuel rod;

the first and second dimples each including a dimple plate and a pair of dimple ligaments, the dimple plates each being shaped to include a dimple contour, the dimple contour substantially complementarily engaging the fuel rod; and in which the spring contour is generally of a spring radius and the dimple contour is generally of a dimple radius when the spring apparatus is in a relaxed condition, and in which the at least first fuel rod is of a fuel rod radius, the spring radius and the dimple radius each being greater than the fuel rod radius.

* * * * *